United States Patent
Babbellapati et al.

(10) Patent No.: US 11,863,275 B2
(45) Date of Patent: Jan. 2, 2024

(54) SPATIAL STREAM OPTIMIZATION USING DYNAMIC BANDWIDTH

(71) Applicant: QUALCOMM Incorporated, San Diego, CA (US)

(72) Inventors: Syam Krishna Babbellapati, Chennai (IN); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 17/321,310

(22) Filed: May 14, 2021

(65) Prior Publication Data

US 2022/0368400 A1 Nov. 17, 2022

(51) Int. Cl.
*H04W 72/12* (2023.01)
*H04W 72/04* (2023.01)
*H04B 7/06* (2006.01)
*H04W 72/0453* (2023.01)
*H04W 72/1273* (2023.01)
*H04W 84/12* (2009.01)

(52) U.S. Cl.
CPC ...... *H04B 7/0695* (2013.01); *H04W 72/0453* (2013.01); *H04W 72/1273* (2013.01); *H04W 84/12* (2013.01)

(58) Field of Classification Search
CPC .. H04W 52/0216; H04W 76/28; H04W 84/12
See application file for complete search history.

(56) References Cited

U.S. PATENT DOCUMENTS

| 10,070,339 B2 | 9/2018 | Chhabra et al. |
| 2011/0312288 A1* | 12/2011 | Fu ............ H04B 1/406 455/88 |
| 2012/0069766 A1* | 3/2012 | Fu ............ H04B 15/00 370/332 |

(Continued)

FOREIGN PATENT DOCUMENTS

| CN | 112055372 A | 12/2020 |
| EP | 2966932 A1 | 1/2016 |

OTHER PUBLICATIONS

International Search Report and Written Opinion—PCT/US2022/071162—ISA/EPO—dated Jun. 21, 2022 (2101361WO).

*Primary Examiner* — Romani Ohri
(74) *Attorney, Agent, or Firm* — Arun Swain

(57) ABSTRACT

This disclosure provides systems, methods and apparatus, including computer programs encoded on computer storage media, for spatial stream optimization using dynamic bandwidth. A WiFi scheduler of an access device, such as a customer premises equipment (CPE), may obtain communication parameters about a cellular connection of the access device, such as bandwidth part (BWP) information or start and end markers of downlink data transmissions over the cellular connection. The access device may select a number of spatial streams (NSS) for wireless local area network (WLAN) communications according to the received communication parameters pertaining to the cellular connection, and communicate with one or more stations (STAs) over a WLAN connection using the selected number of spatial streams.

27 Claims, 7 Drawing Sheets

(56) References Cited

U.S. PATENT DOCUMENTS

2013/0343251 A1* 12/2013 Zhang ................ H04W 52/028
370/311
2015/0296450 A1* 10/2015 Koo ..................... H04W 48/16
455/435.3
2016/0316488 A1* 10/2016 Ko .................... H04W 52/0216

* cited by examiner

SPATIAL STREAM OPTIMIZATION USING DYNAMIC BANDWIDTH

TECHNICAL FIELD

This disclosure relates to wireless communications, including spatial stream optimization using dynamic bandwidth.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at an access device. The method may include obtaining one or more communication parameters associated with a connection state of a cellular modem associated with the access device, selecting a number of spatial streams for a wireless local area network (WLAN) access point (AP) associated with the access device in accordance with the one or more communication parameters associated with the connection state of the cellular modem, and communicating with one or more stations (STAs) served by the access device using the WLAN AP in accordance with the connection state of the cellular modem and the number of spatial streams for the WLAN AP.

Another innovative aspect of the subject matter described in this disclosure can be implemented in an apparatus for wireless communications at an access device. The apparatus may include a first interface, a second interface, and a processing system. The first interface may be configured to obtain one or more communication parameters associated with a connection state of a cellular modem associated with the access device. The processing system may be configured to select a number of spatial streams for a WLAN AP associated with the access device in accordance with the one or more communication parameters associated with the connection state of the cellular modem. The second interface may be further configured to communicate with one or more STAs served by the access device using the WLAN AP in accordance with the connection state of the cellular modem and the number of spatial streams for the WLAN AP.

Another innovative aspect of the subject matter described in this disclosure can be implemented in an apparatus for wireless communications at an access device. The apparatus may include a processor, memory coupled with the processor, and instructions stored in the memory. The instructions may be executable by the processor to cause the apparatus to obtain one or more communication parameters associated with a connection state of a cellular modem associated with the access device, select a number of spatial streams for a WLAN AP associated with the access device in accordance with the one or more communication parameters associated with the connection state of the cellular modem, and communicate with one or more STAs served by the access device using the WLAN AP in accordance with the connection state of the cellular modem and the number of spatial streams for the WLAN AP.

Another innovative aspect of the subject matter described in this disclosure can be implemented in an apparatus for wireless communications at an access device. The apparatus may include means for obtaining, from the cellular modem associated with the access device, one or more communication parameters associated with a connection state of the cellular modem with the BS, means for selecting a power mode for a WLAN AP associated with the access device in accordance with the one or more communication parameters associated with the connection state of the cellular modem, and means for communicating with one or more STAs served by the access device using the WLAN AP in accordance with the connection state of the cellular modem and the power mode for the WLAN AP.

Another innovative aspect of the subject matter described in this disclosure can be implemented in a non-transitory computer-readable medium storing code for wireless communications at an access device. The code may include instructions executable by a processor to obtain one or more communication parameters associated with a connection state of a cellular modem associated with the access device, select a number of spatial streams for a WLAN AP associated with the access device in accordance with the one or more communication parameters associated with the connection state of the cellular modem, and communicate with one or more STAs served by the access device using the WLAN AP in accordance with the connection state of the cellular modem and the number of spatial streams for the WLAN AP.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
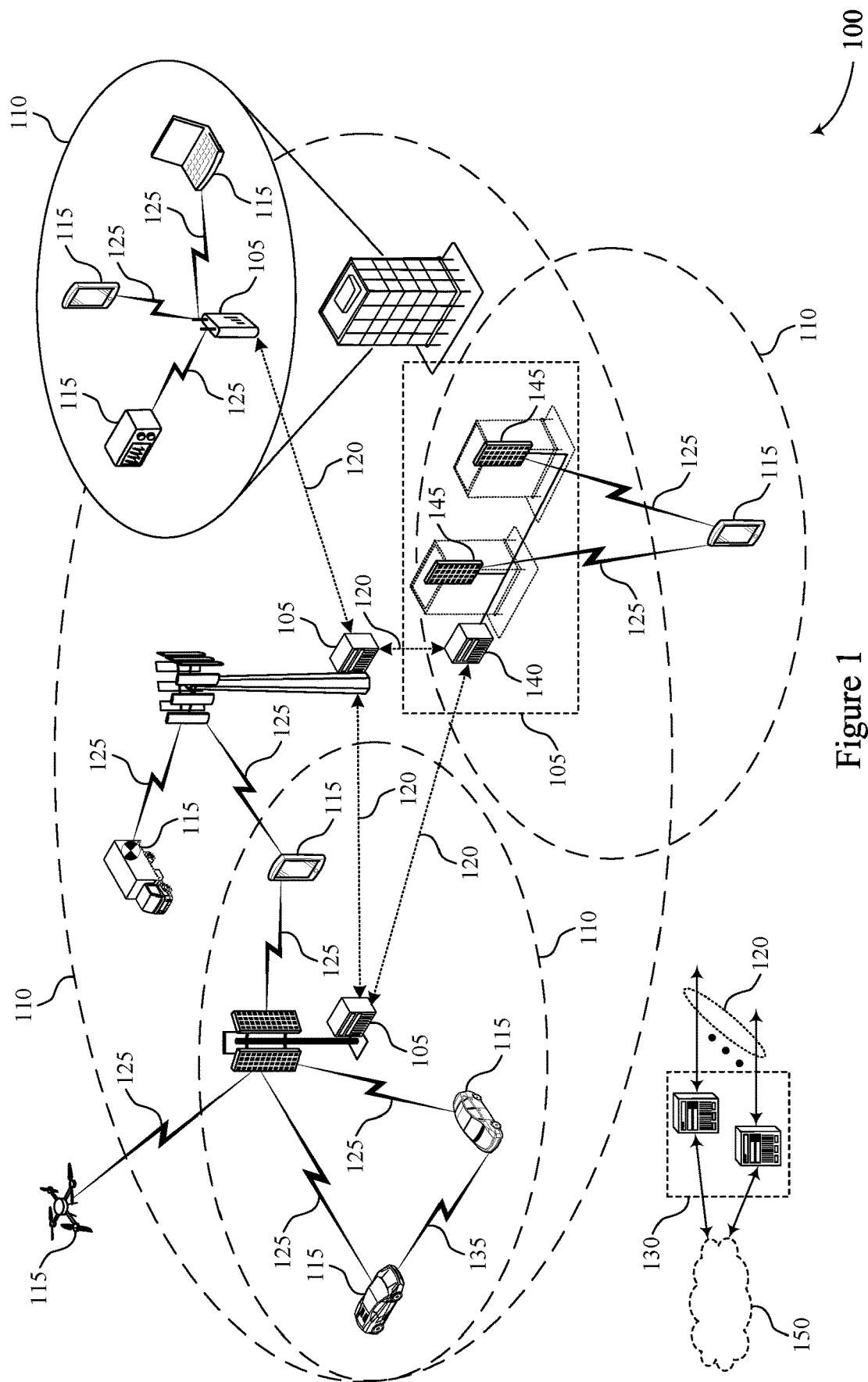
FIG. 1 illustrates an example wireless communications system that supports spatial stream optimization using dynamic bandwidth.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some systems, an access device may function as a customer premises equipment (CPE) which forwards data between a cellular network, such as a 5G network, and one or more stations (STAs) wirelessly connected to the access device over a wireless local area network (WLAN), such as a WiFi network. In such systems, the access device may include or otherwise feature a WLAN access point (AP) and interface with the cellular network via a cellular modem. The WLAN AP and the cellular modem of the access device may be located at a same physical location (within a single box) or may be located at different physical locations (such as outside of a building and inside of the building). The WLAN AP of the access device may be unaware of power saving mode events of the cellular network, and vice versa. For example, a WiFi scheduler of the WLAN AP may perform power conservation procedures, such as, for example, reducing a number of spatial streams (NSS) on a WiFi interface to reduce a power consumption of the WLAN AP. On the other hand, the cellular network (for example, a 5G NR network) may dynamically change a bandwidth part (BWP) configuration of the access device, including a quantity of BWPs used by the access device to communicate over the cellular network, to accommodate an increased amount of downlink traffic from the cellular network. If the WiFi scheduler of the WLAN AP is unaware the dynamic BWP changes at the cellular modem, the power optimization and conservation practices may be sub-optimal.

In some implementations of the present disclosure, the access device may look-ahead at an expected amount of downlink data from the cellular network in order to determine a NSS to use for upcoming communications by the WLAN AP. The access device may obtain, from the cellular modem, a number of communication parameters, such as a number of BWPs configured at the cellular modem, or a start and end marker of downlink data at the cellular modem. The access device (for example, the WiFi scheduler of the access device) may use these communication parameters to look ahead to predict an amount of incoming data that is expected to be transmitted by the WLAN AP. The access device may select a NSS to be used at the WLAN AP according to the predicted amount of incoming data, and may communicate with one or more STAs over the WLAN using the selected NSS.

Particular implementations of the subject matter described in this disclosure can be implemented to realize one or more of the following potential advantages. The described techniques may be implemented to achieve improved communications between WiFi communications systems and other communications systems, including systems operating according to 5G or other cellular systems. The described techniques may decrease latency by improving efficient use of available dataflow. The described techniques also may save power and battery usage by operating based on a global view of incoming data in an access point (AP) system. The described techniques also may improve user experience by decreasing oscillations in the selected NSS in a WiFi system.

FIG. 1 illustrates an example wireless communications system 100 that supports spatial stream optimization using dynamic bandwidth. The wireless communications system 100 may include one or more base stations (BSs) 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some implementations (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (for example, UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In some cases, a network device, such as a BS 105, may distribute different layers of functionality across physically separated components. For example, one or more of the BSs 105 described herein may operate as or otherwise implement a disaggregated radio access network (D-RAN) or an open radio access network (O-RAN).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

ABS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as one or more components of a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

An access device as described with respect to FIG. 1 may connect with a communication device, such as one or more components of a BS 105 or a sidelink device, via a cellular modem associated with the access device. In some implementations, the BS 105 of FIG. 1 may implement a disaggregated architecture, such as an open radio access network (O-RAN) architecture, in which components implementing different layers of network functionality are virtualized, physically separated, or both. The access device may obtain, from the cellular modem associated with the access device, one or more communication parameters associated with a connection state of the cellular modem with the communication device. The one or more communication parameters may include an indication of one or more bandwidth parts, or an indication of a start marker and an end marker of data, or both. The access device may select a number of spatial steams for a WLAN AP associated with the access device in accordance with the one or more communication parameters associated with the connection state of the cellular modem. The access device may communicate with one or more STAs served by the access device using the WLAN AP in accordance with the connection state of the cellular modem and the NSS for the WLAN AP.

Figure 2:
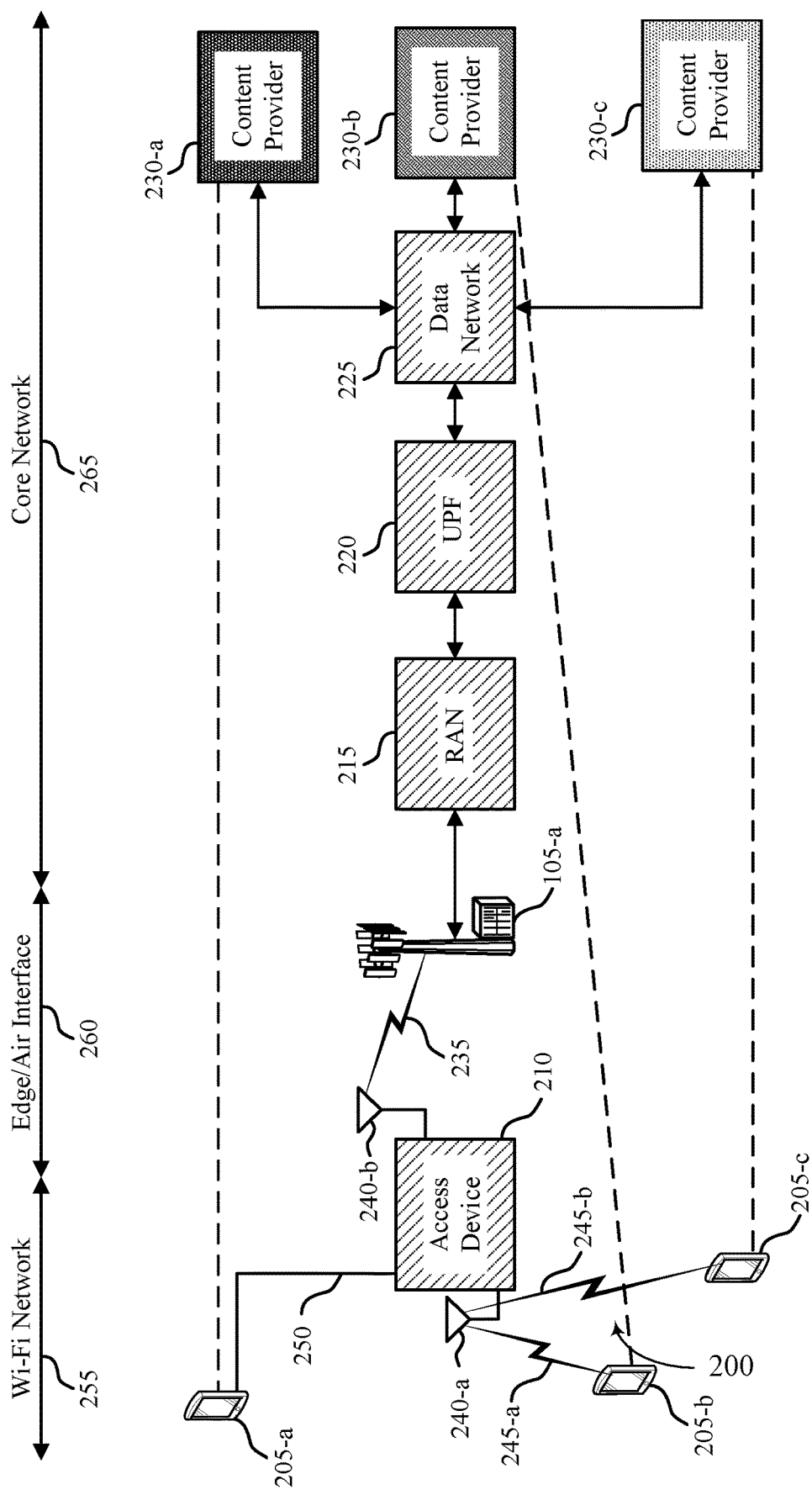
FIG. 2 illustrates an example network environment that supports spatial stream optimization using dynamic bandwidth.

FIG. 2 illustrates an example network environment 200 that supports spatial stream optimization using dynamic bandwidth. The network environment 200 may implement or be implemented to realize aspects of the wireless communications system 100. For example, the network environment 200 may illustrate communication between multiple STAs 205, an access device 210, and a BS 105-*a*, which may be examples of corresponding devices described herein, including with reference to FIG. 1. BS 105-*a* may be an example of a BS 105, or another communication device. In some examples, the access device 210 may be an example of a 5G-CPE including a WLAN AP (such as a WiFi modem or AP) and a cellular modem (such as a 5G modem) and may include a quality of service (QoS) manager interfacing the WLAN AP and the cellular modem. In some implementations, the QoS manager may select a power mode for the WLAN AP functionality of the access device 210 in accordance with various events or communication parameters associated with a connection state between the cellular modem and the BS 105-*a*. As such, the QoS manager may coordinate or synchronize power management actions (such as sleep schedules and connection states) between both the WLAN AP functionality and the cellular modem functionality of the access device 210.

The network environment 200 may include various air or area networks or interfaces, including a WiFi network 255, an air interface 260 (which may be equivalently referred to as an edge interface), and a core network 265. The core network 265 may include several entities which may buffer, schedule, and transmit data provided from a set of content providers 230 to the BS 105-*a* (for example, communication device). In some implementations, the core network 265 may include a radio access network (RAN) 215, a UPF 220, a data network 225, and the content providers 230. The data network 225 may transfer data between the content providers 230 and the UPF 220 through a process of data switching, system control, interconnection transmission lines, or a combination thereof. The UPF 220 may receive the data from the data network 225 and transmit the data to the RAN 215. In some examples, the UPF 220 may select or otherwise determine which elements of the data received from the data network 225 that the UPF 220 may buffer and may schedule the data transmission of the data to the RAN 215 to mitigate or otherwise reduce latency (for example, according to some scheduling timeline) or in accordance with current radio conditions.

Upon receiving the data from the UPF 220, the RAN 215 may schedule different sets of information (for example, different portions of the received data) to corresponding STAs 205. For instance, the RAN 215 may receive a first portion of data from a content provider 230-a, a second portion of data from a content provider 230-b, and a third portion of data from a content provider 230-c and may direct the first portion of data to the STA 205-a, the second portion of data to the STA 205-b, and the third portion of data to the STA 205-c in accordance with which content provide 230 each STA 205 is associated with (or which content provider 230 an application running at each STA 205 is associated with). As shown in FIG. 2, the associations between the content providers 230 and the STAs 205 are illustrated by dashed lines between the content providers 230 and the STAs 205. The RAN 215 may configure the scheduling policy, signal quality, or signal strength, or a combination thereof, to configure a time and a power at which the BS 105-a may transmit the data to the access device 210. The various elements of the core network 265 may work together to minimize latency and improve the overall QoS for the STAs 205. The RAN 215 may send the data to the BS 105-a, which may serve as a transition or interface between the core network 265 and the air interface 260.

The BS 105-a, upon receiving the data from the content providers 230 via the RAN 215, may transmit the data to the access device 210 via a communication link 235 (such as an over-the-air (OTA) cellular connection). In some examples, cellular communication may rely on a dynamic bandwidth that is dependent on one or more communication factors or variables and may experience dynamic or frequently changing radio conditions. For example, the BS 105-a may communicate with the access device 210 over the communication link 235 and, in some implementations, communication over the communication link 235 may be sensitive to various environmental conditions. For instance, communication over the communication link 235 may be adversely affected by weather (such as rain or snow, among other examples) or physical barriers (such as cars, buildings, or trees, among other examples). In some examples, such environmental conditions, or the magnitude of their influence on the communication between the BS 105-a and the access device 210, may vary in a dynamic nature or according to relatively short timelines.

In some aspects, for example, the BS 105-a and the access device 210 may communicate over the communication link 235 using a millimeter wave (mmW) radio frequency band, which may be sensitive to such various environmental conditions. As a result of such dynamic radio conditions, the BS 105-a may adjust one or more communication parameters relatively frequently to increase the likelihood for successful communication between the BS 105-a and the access device 210 (for example, to provide a sufficiently strong signal to the access device 210).

In some examples, the access device 210 may communicate with the BS 105-a via the cellular modem of (or associated with) the access device 210. For example, the cellular modem may receive signaling sent over the communication link 235 from the BS 105-a using an antenna 240-b. In some implementations, the cellular modem of the access device 210 may be co-located with the WLAN AP of the access device 210 (and, as such, the access device 210 may be understood as one box). In some other implementations, the cellular modem of the access device 210 may be located at a different physical location than the WLAN AP of the access device 210 (and, as such, the access device 210 may be understood as two boxes). In such implementations in which the cellular modem and the WLAN AP of the access device 210 are separately located, the cellular modem may be located at an exterior of a building and the WLAN AP may be located within the building. Accordingly, the cellular modem may be referred to or otherwise understood as an outdoor data unit (ODU) and the WLAN AP may be referred to or otherwise understood as an indoor data unit (IDU). The WLAN AP and the cellular modem may communicate via any signaling mechanism, such as via a wired connection (for example, via an Ethernet cable) or a wireless connection.

Regardless of whether the cellular modem and the WLAN AP are co-located or located at different physical locations, the cellular modem may transmit the data received from the BS 105-a to the WLAN AP, which may send the data to the STAs 205. The WLAN AP may communicate with the STAs 205 in various ways, such as via a wired connection or via a wireless connection. For example, the WLAN AP may wirelessly communicate with the STA 205-b and the STA 205-c using the antenna 240-a via a wireless communication link 245-a and a wireless communication link 245-b, respectively. Additionally, or alternatively, the WLAN AP may communicate with the STA 205-a via a communication link 250 (such as an Ethernet or fiber optic connection). Further, although the network environment 200 shows one access device 210 and three STAs 205, the network environment 200 may include any number of access devices 210 that communicate with any number of STAs 205 without exceeding the scope of the present disclosure.

In some examples, one or more components of the BS 105-a may dynamically change the bandwidth of the air interface 260 between the access device 210 and the BS 105-a by adding or removing BWPs. For example, one or more components of the BS 105-a may dynamically change bandwidth by changing the number of BWPs used by the BS 105-a to transmit data to the access device 210. In some implementations, dynamically adjustable BWP configurations may improve low latency communications by increasing the number of BWPs commensurate with the amount of data to be communicated or the latency requirements associated with the data.

In some cases, the WLAN AP of the access device 210, may not automatically be made aware of such changes at the cellular modem. In the absence of communication and coordination between the cellular modem and the WLAN AP, the WLAN AP may take power optimization steps which may not align with the objectives associated with dynamic BWP changes at the cellular modem. For example, the WLAN AP may switch to a lower NSS for WiFi communications as a power saving measure without knowing that the BS 105-a has recently added BWPs to the cellular connection in anticipation of a large downlink transmission to the cellular modem. In such an example, the power saving measures taken by the WLAN AP may reduce a WiFi throughput capability of the access device 210 and actually reduce power efficiency.

To improve coordination between the WLAN AP and the cellular modem of the access device 210, the WLAN AP may receive from the cellular modem indications of dynamic BWP changes or other communication parameters associated with cellular communications, such as start and end markers of downlink data transmissions. Using this information the WLAN AP may align NSS adjustments for WiFi transmissions with the dynamic BWP changes or communication parameters associated with the cellular modem.

In one example, the WLAN AP of the access device 210 may obtain an indication of the number of BWPs configured at the cellular modem of the access device 210, and use this information to predict a short-term bandwidth requirement at the WLAN AP for the wireless communication link 245-a or the wireless communication link 245-b. One or more components of the WLAN AP, such as a WiFi scheduler, may switch to a higher NSS for transmissions by the WLAN AP over the wireless communication link 245-a or the wireless communication link 245-b based on the predicted bandwidth requirement. Thus, the information provided by the cellular modem may aid in achieving increased network efficiency, lower latency, and power savings by the WLAN AP of the access device 210.

In another example, for each data transfer initiated with the RAN 215, the cellular modem may mark incoming data and convey data start and end markers to one or more components of the WLAN AP, such as the WiFi scheduler. The data start and end markers may provide a reasonably accurate basis for approximating an amount of incoming data to be forwarded over the wireless communication link 245-a or the wireless communication link 245-b. The WiFi scheduler may thus be aware of a global view of the data coming into the WiFi communications systems across client by receiving communication parameters from the modem.

The cellular modem may determine whether to provide the indication of the BWP configuration or the start and end markers based on power optimization requirements of the WLAN AP or another component of the access device 210. In either implementation, the WiFi scheduler may switch to a higher NSS based on the communications parameters obtained from the cellular modem in order to decrease latency, improve efficiency, and optimize battery performance. The WiFi scheduler may change the NSS for a period of time, and may turn to an original NSS (for example, after a number of TTIs).

The WLAN AP of the access device 210 may communicate with one or more STAs 205 according to the selected NSS.

Figure 3:
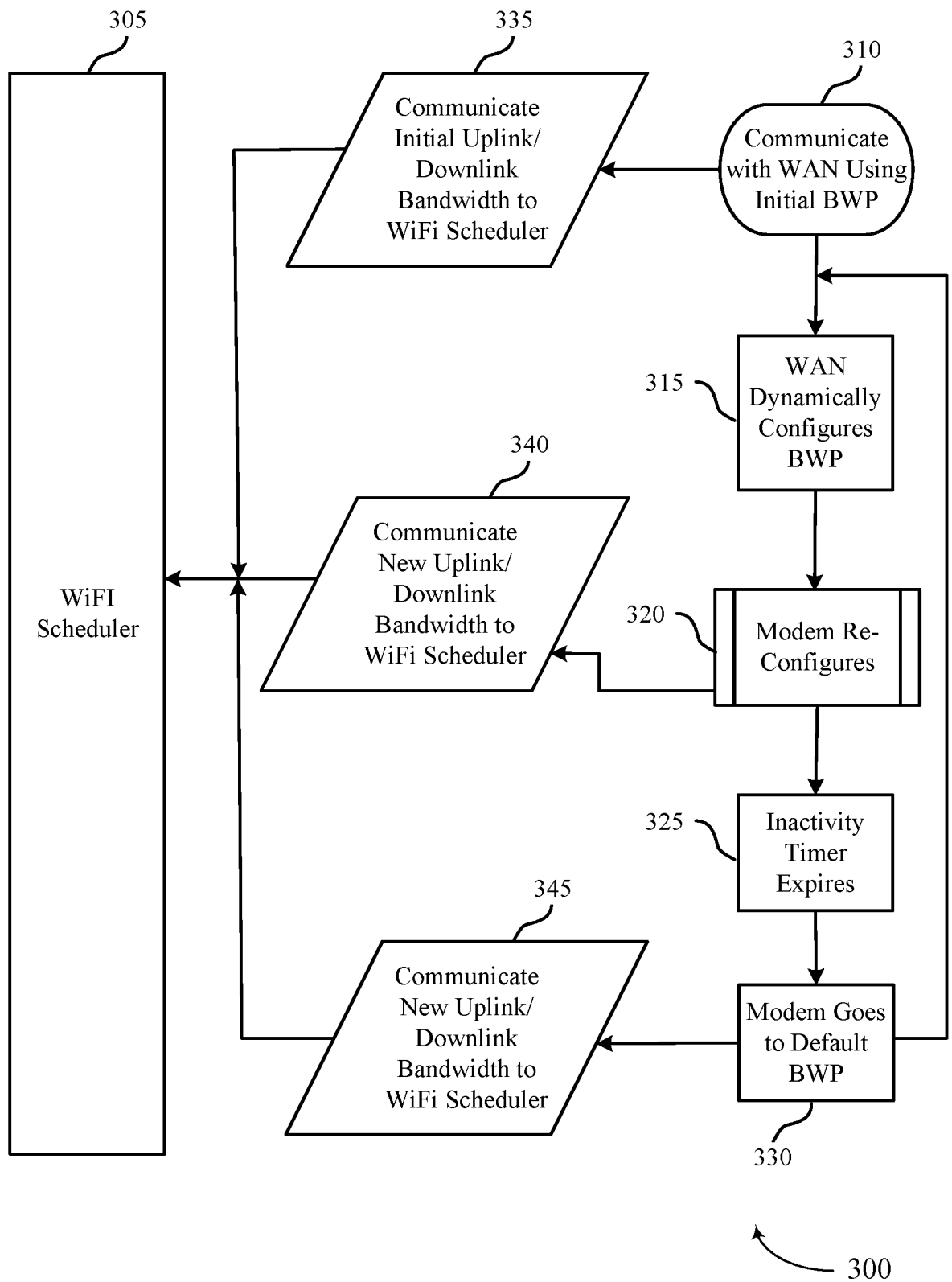
FIG. 3 illustrates an example communication flow that supports spatial stream optimization using dynamic bandwidth.

FIG. 3 illustrates an example communication flow 300 that supports spatial stream optimization using dynamic bandwidth. Devices operating in a wireless communications system incorporating WiFi procedures may operate and communicate according to the communication flow 300. For example, cellular components of an access device, such as a cellular modem of the access device 210 described with respect to FIG. 2, may initiate procedures, and communicate with a WiFi Scheduler 305 of the access device (for example, a WiFi scheduler 305 of a WLAN portion of the access device).

At 310, a cellular modem of the access device may communicate with a WAN, via one or more components of a BS 105 as described in FIG. 1 or FIG. 2, using an initial BWP. At 335, the network may communicate an indication of the initial BWP to the WiFi scheduler 305. This communication may include respective indications of an initial uplink bandwidth and an initial downlink bandwidth used to communicate with the WAN.

At 315, the WAN may dynamically configure the BWP used by the cellular modem of the access device, for example by signaling an increase or decrease in the number of BWPs to be used by the cellular modem of the access device in communicating with the WAN. This signaling of an increase or decrease in the number of BWPs may be communicated by the WAN via one or more components of the BS 105.

At 320, the cellular modem may reconfigure communications according to the dynamically updated BWPs at 315. The reconfiguration may include updating the number of BWPs used by the cellular modem in accordance with the dynamic configuration signaled change in the BWP configuration at the network (for example, the BWP configuration can be changed by one or more components of a BS 105) at 315. At 340, the cellular modem may communicate an indication of the new uplink and downlink WAN bandwidths to the WiFi scheduler 305.

At 325, an inactivity timer may expire. For example, the inactivity timer may expire based on a lack of data transmitted or received during a period of time. At 320, the modem (for example, wireless cellular modem) may return to a default number of BWPs. Returning to the default number of BWPs may be indicated back to the network (for example, to one or more components of a BS 105). At 345, the cellular modem may communicate a return to a default number of BWPs to the WiFi scheduler 305, including an indication of the new uplink and downlink WAN bandwidth. In some implementations, the new uplink and downlink WAN bandwidths may be the same as the initial uplink and downlink bandwidths at 335.

The WiFi scheduler 305 may therefore receive multiple communications, such as at 335, 340, and 345, from the cellular modem indicating changes to uplink and downlink WAN bandwidth. As a result of receiving this information, the WiFi scheduler 305 may expect changes in WiFi throughput, and may dynamically update the NSS used for WiFi communications based on the BWP changes for WAN communications, as well as data start and end marker indications, as described herein with respect to FIG. 4.

Figure 4:
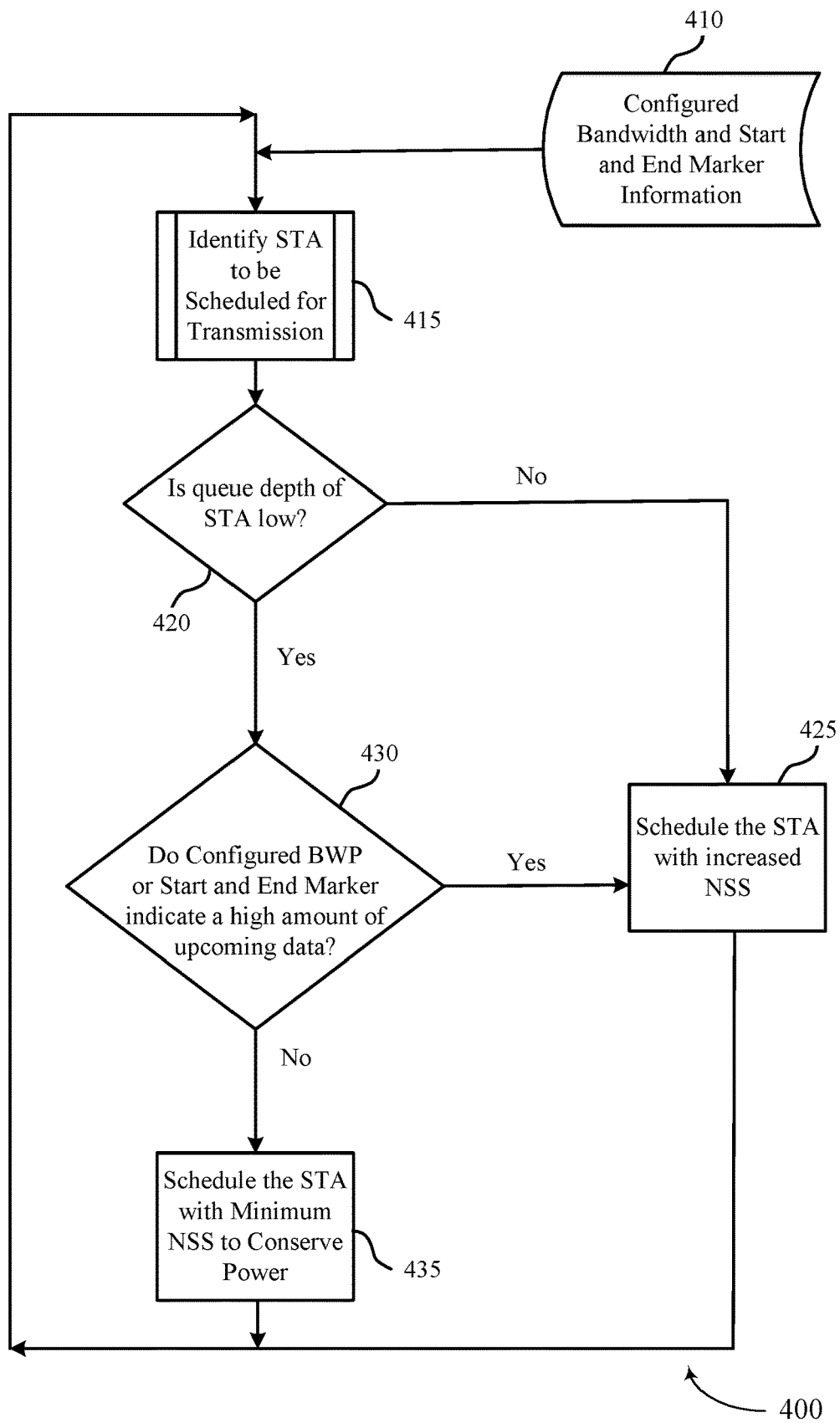
FIG. 4 illustrates an example decision flow that supports spatial stream optimization using dynamic bandwidth.

FIG. 4 illustrates an example decision flow 400 that supports spatial stream optimization using dynamic bandwidth. A WiFi scheduler may be a part of an access device as described herein. The WiFi scheduler may perform the decision flow 400 outlined in FIG. 4. The WiFi scheduler performing decision flow 400 may be an example of a WiFi scheduler 305 of a WLAN AP portion of an access device, such as a CPE, as described with respect to FIG. 3.

At 410, the WiFi scheduler may receive (or otherwise obtain via a wired or wireless interface) an indication of configured BWPs for cellular communications between the access device and a WAN, or an indication of start marker and end markers for downlink data received from the WAN, or both. The WiFi scheduler may receive the indication of the configured BWPs, the indication of the start and end markers, or both) from a cellular modem of the access device, as described with respect to FIG. 3. From this information, the WiFi scheduler may expect to forward the downlink data received from the WAN to one or more recipient STAs over WiFi.

At 415, the WiFi scheduler may identify the one or more recipient STAs to be scheduled to receive the upcoming data over WiFi. For example, the WiFi scheduler may identify the one or more recipient STAs from one or more recipient addresses associated with the data received from the WAN.

At 420, the WiFi scheduler may determine whether a queue depth is low for each of the one or more recipient STAs. A low queue depth in a recipient STA may be determined by comparing a number of requests in the request queue for the recipient STA to a depth threshold. At 425, the WiFi scheduler may, if the queue depth for the recipient STA is not low (indicating a large amount of incoming data for the recipient STA), schedule the recipient STA for communications with an increased NSS. In some implementations, the recipient STA may be scheduled with a maximum NSS.

At 430, if the queue depth for a recipient STA is low, the WiFi scheduler may check whether the configured BWP, or the start markers and end markers, or both, indicate an increased amount of upcoming data. At 425, if the start and end markers or the configured BWP, or both, indicate a high amount of upcoming data for the recipient STA, the WiFi scheduler may schedule the STA with an increased NSS, possibly a maximum NSS. At 435, if the start and end markers or the configured BWP, or both, indicate a lower amount of upcoming data for the recipient STA, the WiFi scheduler may schedule the recipient STA with a lower NSS, possibly a minimum NSS, in an effort to conserve power.

The decision flow 400 may cycle as a loop, and may restart after a number of TTIs, a timer expiration, or according to some other defined trigger.

Figure 5:
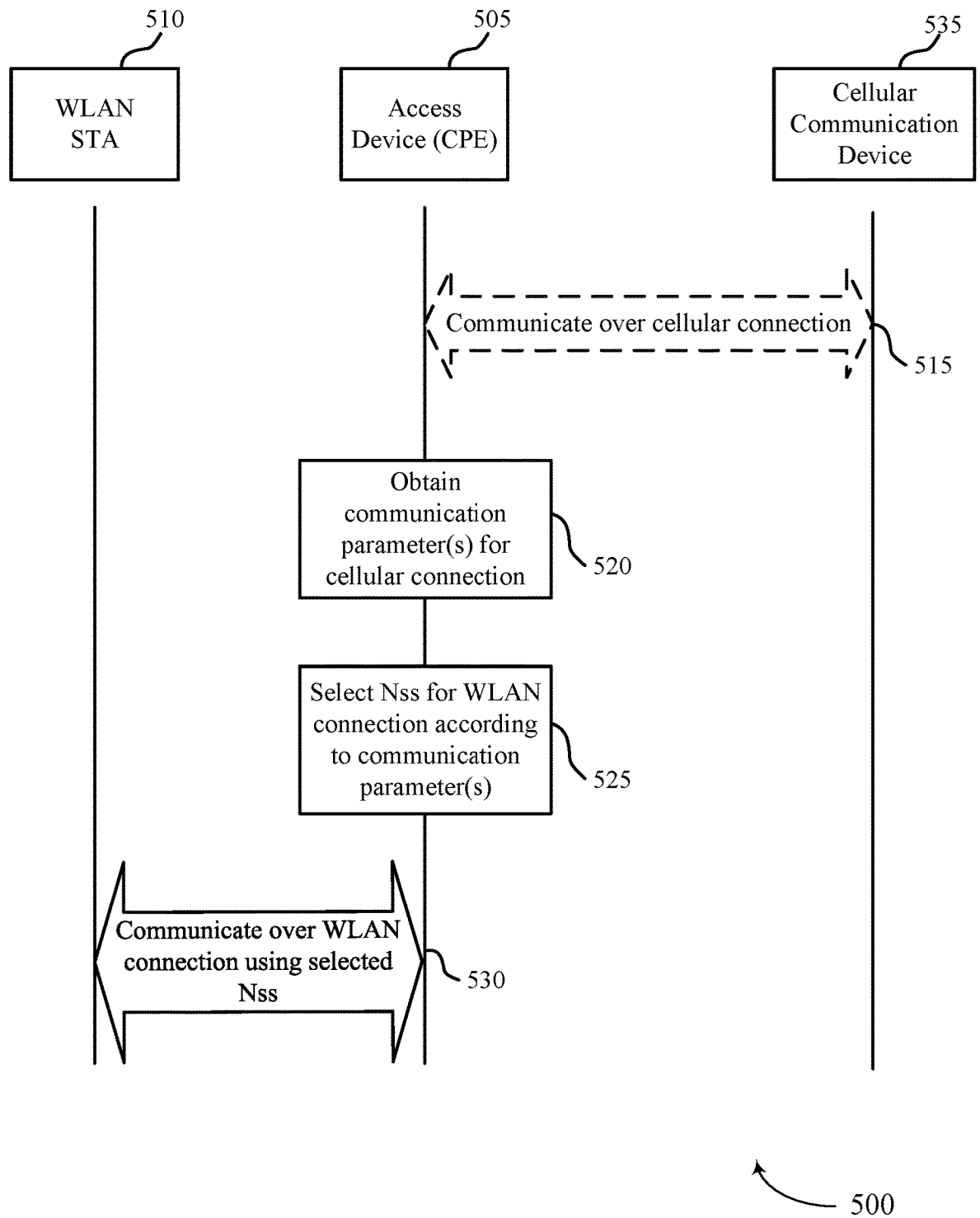
FIG. 5 illustrates an example process flow that supports spatial stream optimization using dynamic bandwidth.

FIG. 5 illustrates an example process flow 500 that supports spatial stream optimization using dynamic bandwidth. The process flow 500 may be implemented by an access device 505. The access device 505 may communicate with a STA 510 over a WLAN, such as a WiFi network. The access device 505 may be an example of or otherwise implement an access device 210 or a WiFi scheduler 305 or as described with respect to FIGS. 2-4, respectively.

In some implementations, at 515, the access device 505 may communicate with a cellular communication device 535 via a cellular modem. The cellular communication device 535 may be an example of one or more components of a BS 105 (including one or more virtualized or physically separated components of a BS 105 implementing a disaggregated architecture, such as an O-RAN architecture), a sidelink device, or another device capable of communicating with the access device 505 over the cellular network.

At 520, the access device 505 may obtain one or more communication parameters associated with a connection state of a cellular modem associated with the access device 505. In some implementations, the one or more communication parameters may include an indication of one or more BWPs configured for the cellular modem to communicate with the cellular communication device 535. In these implementations, selecting the number of spatial stream at 525 may be based on the one or more BWPs.

In some other implementations, the one or more communication parameters may include an indication of a data start marker and a data end marker associated with data transmission to the cellular modem. In these implementations, selecting the NSS at 525 may be based on the data start marker and the data end marker.

At 525, the access device 505 may select a NSS for a WLAN connection between a WLAN AP of the access device 505 and the STA 510 in accordance with the one or more communication parameters associated with the connection state of the cellular modem. For example, the access device 505 may selectively increase the NSS of the WLAN connection for a number of TTIs when the one or more communication parameters of the cellular connection indicate that more downlink data is expected over the cellular connection. Additionally, or alternatively, the access device 505 may selectively decrease the NSS of the WLAN connection when the one or more communication parameters of the cellular connection indicate that less downlink data is expected over the cellular connection. The access device 505 may return to a default or initial NSS setting after a termination of the number of TTIs. In some cases, the number of TTIs may be fixed or standardized. Additionally, or alternatively, the access device 505 may dynamically select the number of TTIs according to the one or more communication parameters of the cellular connection.

In implementations where the one or more communication parameters of the cellular connection obtained at 520 include the number of BWPs configured for the cellular connection, the access device 505 may selectively increase or decrease the NSS in accordance with a change in a number of the one or more BWPs configured for the cellular modem.

In some implementations, the access device 505 may detect an increase in bandwidth associated with the change in the number of the one or more BWPs configured for the cellular modem. In some implementations, the access device 505 may receive an indication of a change in the number of the one or more BWPs configured for the cellular modem. An increase in BWPs configured for the cellular modem of an access device 505 may indicate that more bandwidth may be used to communicate data to the access device 505 over a cellular connection. Because the access device 505 may forward data received over the cellular connections to WLAN STAs, an increase in a number of BWPs configured for the cellular modem of the access device 505 may correlate with an increased bandwidth for the upcoming WLAN transmissions by the access device 505. In these implementations, the access device 505 may selectively increase the NSS based on the detected increase.

In some other implementations, the access device 505 may detect a decrease in bandwidth associated with the change in the number of the one or more BWPs configured for the cellular modem. In some implementations, the access device 505 may receive an indication of a change in the number of the one or more BWPs configured for the cellular modem. A decrease in BWPs configured for the cellular modem of an access device 505 may indicate that less bandwidth may be used to communicate data to the access device 505 over a cellular connection. Because the access device 505 may forward data received over the cellular connections to WLAN STAs, a decrease in a number of BWPs configured for the cellular modem of the access device 505 may correlate with a decreased bandwidth for the upcoming WLAN transmissions by the access device 505. In these implementations, the access device 505 may selectively decrease the NSS based on the detected decrease.

In implementations where the one or more communication parameters of the cellular connection obtained at 520 include a data start marker and a data end marker or an amount of downlink data received by the cellular modem, the NSS selected at 525 may be in proportion to the amount of downlink data received or expected to be received by the cellular modem. For example, the access device 505 may increase the NSS based on obtaining the data start marker, and decrease the NSS based on obtaining the data end marker.

At 530, the access device 505 may communicate with one or more STAs including the STA 510 served by the access device 505, using the WLAN AP, in accordance with the connection state of the cellular modem and the NSS for the WLAN AP.

Figure 6:
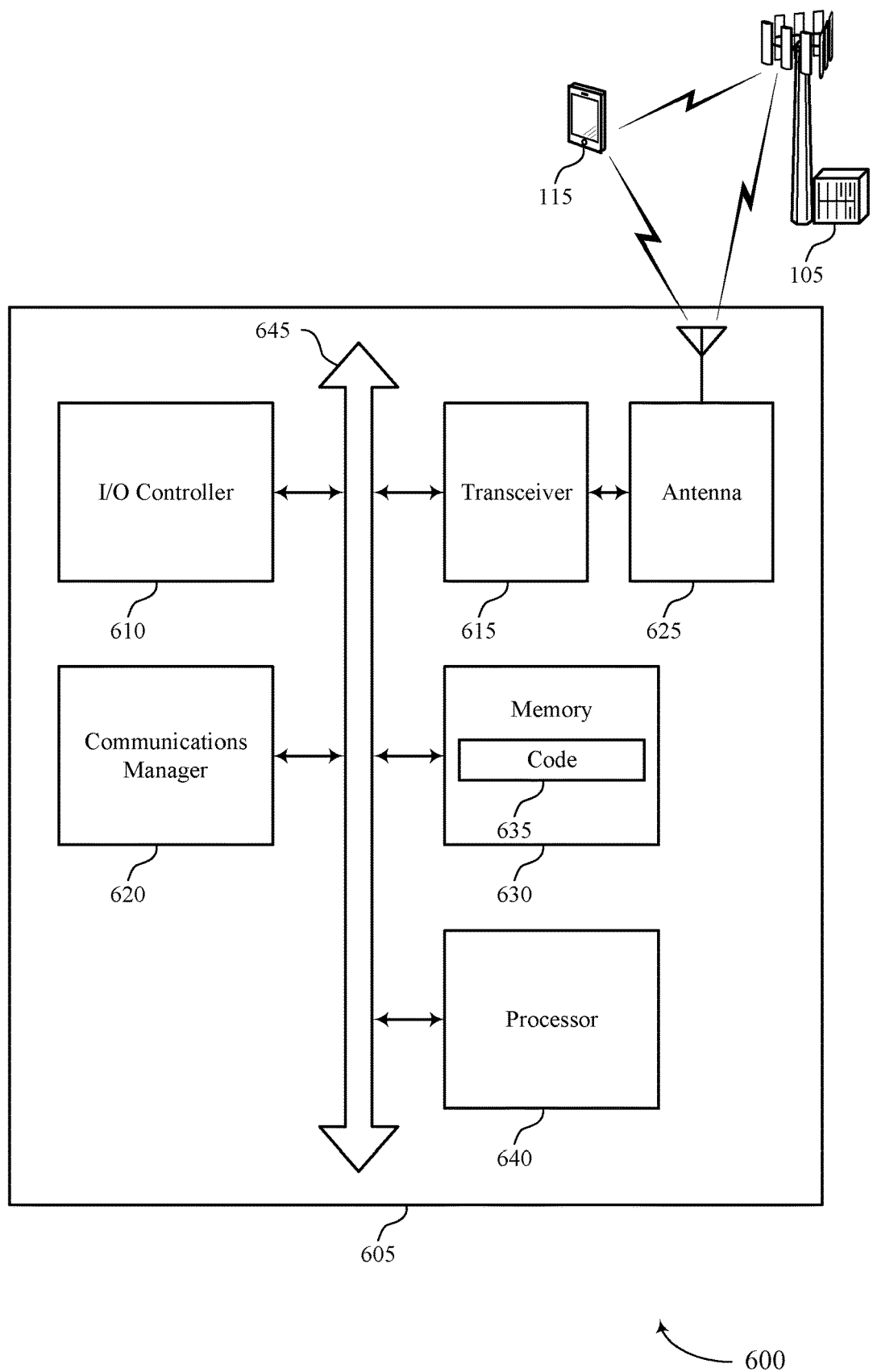
FIG. 6 shows a diagram of an example access device that supports spatial stream optimization using dynamic bandwidth.

FIG. 6 shows a diagram of an example access system 600 including a device 605 that supports spatial stream optimization using dynamic bandwidth. The device 605 may communicate wirelessly with one or more BSs 105, UEs 115, or any combination thereof. The device 605 may include components for bi-directional voice and data communications including components for transmitting and receiving communications, such as a communications manager 620, an input/output (I/O) controller 610, a transceiver 615, an antenna 625, a memory 630, code 635, and a processor 640. These components may be in electronic communication or otherwise coupled (for example, operatively, communicatively, functionally, electronically, electrically) via one or more buses (for example, a bus 645).

The I/O controller 610 may manage input and output signals for the device 605. The I/O controller 610 also may manage peripherals not integrated into the device 605. In some implementations, the I/O controller 610 may represent a physical connection or port to an external peripheral. In some implementations, the I/O controller 610 may utilize an operating system such as iOS®, ANDROID®, MS-DOS®, MS-WINDOWS®, OS/2®, UNIX®, LINUX®, or another known operating system. Additionally or alternatively, the I/O controller 610 may represent or interact with a modem, a keyboard, a mouse, a touchscreen, or a similar device. In some implementations, the I/O controller 610 may be implemented as part of a processor, such as the processor 640. In some implementations, a user may interact with the device 605 via the I/O controller 610 or via hardware components controlled by the I/O controller 610.

In some implementations, the device 605 may include a single antenna 625. However, in some other implementations, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (for example, when compiled and executed) to perform functions described herein. In some implementations, the memory 630 may contain, among other things, a basic I/O system (BIOS) which may control basic hardware or software operation such as the interaction with peripheral components or devices.

The processor 640 may include an intelligent hardware device (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some implementations, the processor 640 may be configured to operate a memory array using a memory controller. In some other implementations, a memory controller may be integrated into the processor 640. The processor 640 may be configured to execute computer-readable instructions stored in a memory (for example, the memory 630) to cause the device 605 to perform various functions (for example, functions or tasks supporting spatial stream optimization using dynamic bandwidth). For example, the device 605 or a component of the device 605 may include a processor 640 and memory 630 coupled to the processor 640, the processor 640 and memory 630 configured to perform various functions described herein.

For example, the communications manager 620 may be configured as or otherwise support a means for obtaining one or more communication parameters associated with a connection state of a cellular modem associated with the access device. The communications manager 620 may be configured as or otherwise support a means for selecting a NSS for a WLAN AP associated with the access device in accordance with the one or more communication parameters associated with the connection state of the cellular modem. The communications manager 620 may be configured as or otherwise support a means for communicating with one or more stations (STAs) served by the access device using the WLAN AP in accordance with the connection state of the cellular modem and the NSS for the WLAN AP.

In some examples, the communications manager 620 may be configured to perform various operations (for example, receiving, monitoring, transmitting) using or otherwise in cooperation with the transceiver 615, the one or more antennas 625, or any combination thereof. Although the communications manager 620 is illustrated as a separate component, in some implementations, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of spatial stream optimization using dynamic bandwidth as described herein, or the processor 640 and the memory 630 may be otherwise configured to perform or support such operations.

Figure 7:
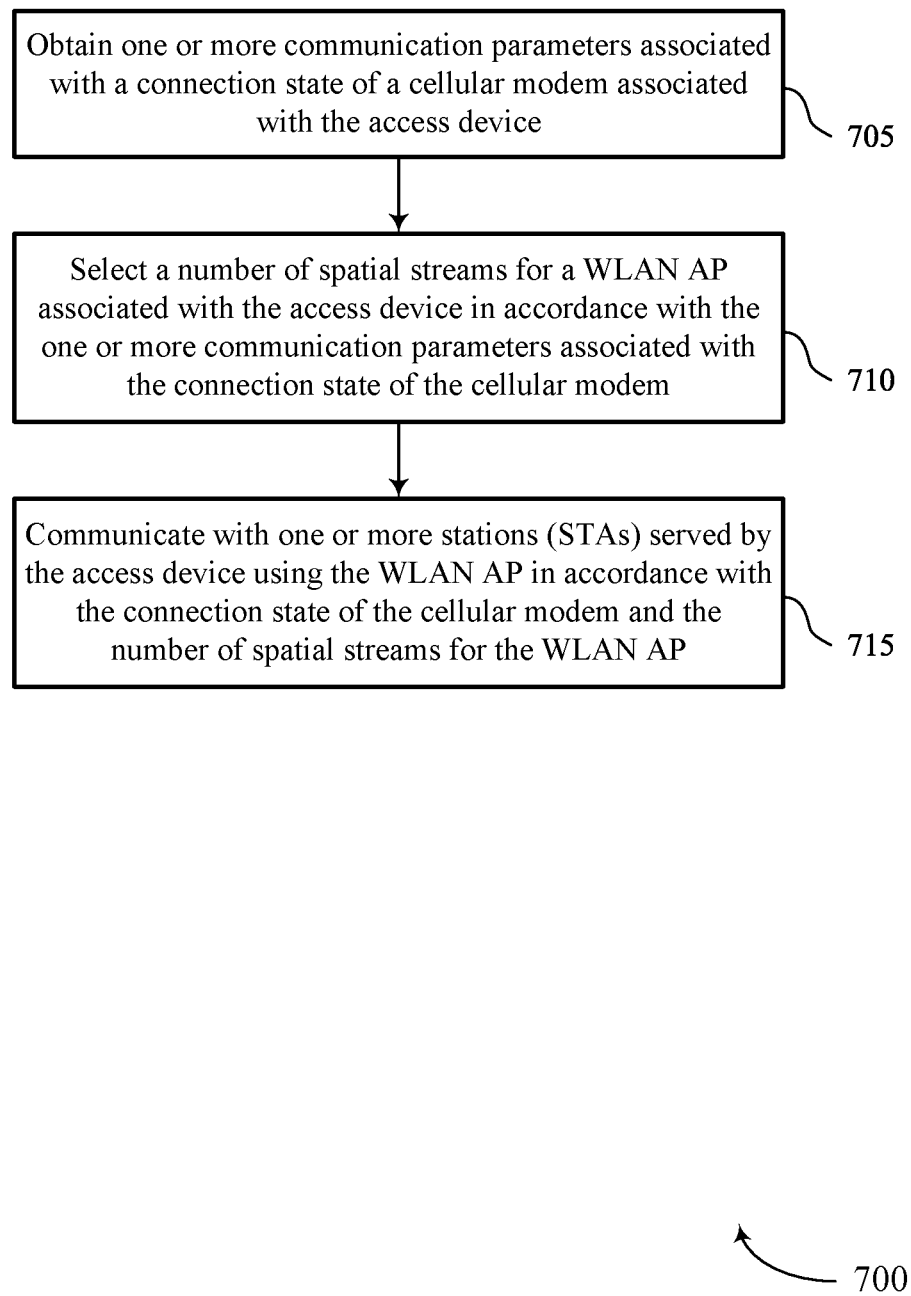
FIG. 7 shows a flowchart illustrating an example method that supports spatial stream optimization using dynamic bandwidth.

FIG. 7 shows a flowchart illustrating an example method 700 that supports spatial stream optimization using dynamic bandwidth. The operations of the method 700 may be implemented by a UE 115 or its components as described herein. For example, the operations of the method 700 may be performed by a UE 115 as described with reference to FIGS. 1-6. In some examples, a UE may execute a set of instructions to control the functional elements of the UE to perform the described functions. Additionally, or alternatively, the UE may perform aspects of the described functions using special-purpose hardware.

At 705, the method may include obtaining one or more communication parameters associated with a connection state of a cellular modem associated with the access device. The operations of 710 may be performed in accordance with examples as disclosed herein.

At 710, the method may include selecting a NSS for a WLAN AP associated with the access device in accordance with the one or more communication parameters associated with the connection state of the cellular modem. The operations of 715 may be performed in accordance with examples as disclosed herein.

At 715, the method may include communicating with one or more stations (STAs) served by the access device using the WLAN AP in accordance with the connection state of the cellular modem and the NSS for the WLAN AP. The operations of 720 may be performed in accordance with examples as disclosed herein.

The following provides an overview of some aspects of the present disclosure:

Aspect 1: A method of wireless communications by an access device, including: obtaining one or more communication parameters associated with a connection state of a cellular modem associated with the access device selecting a NSS for a WLAN AP associated with the access device in accordance with the one or more communication parameters associated with the connection state of the cellular modem; and communicating with one or more STAs served by the access device using the WLAN AP in accordance with the connection state of the cellular modem and the NSS for the WLAN AP.

Aspect 2: The method of aspect 1, where obtaining the one or more communication parameters includes obtaining an indication of one or more BWPs configured for the cellular modem; and selecting the NSS is based at least in part on the one or more BWPs.

Aspect 3: The method of aspect 2, where selecting the NSS based at least in part on the one or more BWPs includes: selectively increasing or decreasing the NSS in accordance with a change in a number of the one or more BWPs configured for the cellular modem.

Aspect 4: The method of aspect 3, further including: detecting an increase in bandwidth associated with the change in the number of the one or more BWPs configured for the cellular modem; and selectively increasing the NSS based at least in part on the detected increase.

Aspect 5: The method of any of aspects 3 through 4, further including: detecting a decrease in bandwidth associated with the change in the number of the one or more BWPs configured for the cellular modem; and selectively decreasing the NSS based at least in part on the detected decrease.

Aspect 6: The method of any of aspects 1 through 5, where obtaining the one or more communication parameters includes obtaining an indication of a data start marker and a data end marker associated with data transmission to the cellular modem; and selecting the NSS is based at least in part on the data start marker and the data end marker.

Aspect 7: The method of aspect 6, further including: determining, based at least in part on the data start marker and the data end marker, an amount of downlink data received by the cellular modem, where the selected NSS is in proportion to the amount of downlink data received by the cellular modem.

Aspect 8: The method of any of aspects 6 through 7, further including: increasing the NSS based at least in part on obtaining the data start marker.

Aspect 9: The method of any of aspects 6 through 8, further including: decreasing the NSS based at least in part on obtaining the data end marker.

Aspect 10: The method of any of aspects 1 through 9, further including: selectively increasing or decreasing the NSS for a number of TTIs; and using an original NSS after a termination of the number of TTIs.

Aspect 11: An apparatus including a processor; memory coupled with the processor; and instructions stored in the memory and executable by the processor to cause the apparatus to perform a method of any of aspects 1 through 10.

Aspect 12: An apparatus including at least one means for performing a method of any of aspects 1 through 10.

Aspect 13: A non-transitory computer-readable medium storing code the code including instructions executable by a processor to perform a method of any of aspects 1 through 10. As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, a FPGA or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus, comprising:
a first interface configured to:
obtain one or more communication parameters associated with a connection state of a cellular modem associated with an access device;
a processing system configured to:
select a number of spatial streams for a wireless local area network (WLAN) access point (AP) associated with the access device in accordance with the one or more communication parameters associated with the connection state of the cellular modem, wherein the number of spatial streams are selected in accordance with one or more bandwidth parts by selectively increasing or decreasing the number of spatial streams in accordance with a change in a number of the one or more bandwidth parts configured for the cellular modem; and
a second interface configured to:
communicate with one or more stations (STAs) served by the access device using the WLAN AP in accordance with the connection state of the cellular modem and the number of spatial streams for the WLAN AP.

2. The apparatus of claim 1, wherein:
obtaining the one or more communication parameters comprises obtaining an indication of one or more bandwidth parts configured for the cellular modem.

3. The apparatus of claim 1, wherein the processing system is further configured to:
detect an increase in bandwidth associated with the change in the number of the one or more bandwidth parts configured for the cellular modem; and
selectively increase the number of spatial streams based at least in part on the detected increase.

4. The apparatus of claim 1, wherein the processing system is further configured to:
detect a decrease in bandwidth associated with the change in the number of the one or more bandwidth parts configured for the cellular modem; and
selectively decrease the number of spatial streams based at least in part on the detected decrease.

5. The apparatus of claim 1, wherein:
obtaining the one or more communication parameters comprises obtaining an indication of a data start marker and a data end marker associated with data transmission to the cellular modem; and
selecting the number of spatial streams is based at least in part on the data start marker and the data end marker.

6. The apparatus of claim 5, wherein the processing system is further configured to:
determine, based at least in part on the data start marker and the data end marker, an amount of downlink data received by the cellular modem, wherein the selected number of spatial streams is in proportion to the amount of downlink data received by the cellular modem.

7. The apparatus of claim 5, wherein the processing system is further configured to:
increase the number of spatial streams based at least in part on obtaining the data start marker.

8. The apparatus of claim 5, wherein the processing system is further configured to:
decrease the number of spatial streams based at least in part on obtaining the data end marker.

9. The apparatus of claim 1, wherein the processing system is further configured to:
selectively increase or decrease the number of spatial streams for a number of transmission time intervals; and
used an original number of spatial streams after a termination of the number of transmission time intervals.

10. A method of wireless communications by an access device, comprising:
obtaining, one or more communication parameters associated with a connection state of a cellular modem associated with the access device;
selecting a number of spatial streams for a wireless local area network (WLAN) access point (AP) associated with the access device in accordance with the one or more communication parameters associated with the connection state of the cellular modem, wherein the number of spatial streams are selected in accordance with one or more bandwidth parts by selectively increasing or decreasing the number of spatial streams in accordance with a change in a number of the one or more bandwidth parts configured for the cellular modem; and
communicating with one or more stations (STAs) served by the access device using the WLAN AP in accordance with the connection state of the cellular modem and the number of spatial streams for the WLAN AP.

11. The method of claim 10, wherein
obtaining the one or more communication parameters comprises obtaining an indication of one or more bandwidth parts configured for the cellular modem.

12. The method of claim 10, further comprising:
detecting an increase in bandwidth associated with the change in the number of the one or more bandwidth parts configured for the cellular modem; and
selectively increasing the number of spatial streams based at least in part on the detected increase.

13. The method of claim 10, further comprising:
detecting a decrease in bandwidth associated with the change in the number of the one or more bandwidth parts configured for the cellular modem; and
selectively decreasing the number of spatial streams based at least in part on the detected decrease.

14. The method of claim 10, wherein:
obtaining the one or more communication parameters comprises obtaining an indication of a data start marker and a data end marker associated with data transmission to the cellular modem; and
selecting the number of spatial streams is based at least in part on the data start marker and the data end marker.

15. The method of claim 14, further comprising:
determining, based at least in part on the data start marker and the data end marker, an amount of downlink data received by the cellular modem, wherein the selected number of spatial streams is in proportion to the amount of downlink data received by the cellular modem.

16. The method of claim 14, further comprising:
increasing the number of spatial streams based at least in part on obtaining the data start marker.

17. The method of claim 14, further comprising:
decreasing the number of spatial streams based at least in part on obtaining the data end marker.

18. The method of claim 10, further comprising:
selectively increasing or decreasing the number of spatial streams for a number of transmission time intervals; and
using an original number of spatial streams after a termination of the number of transmission time intervals.

19. An apparatus, comprising:
means for obtaining, one or more communication parameters associated with a connection state of a cellular modem associated with an access device;
means for selecting a number of spatial streams for a wireless local area network (WLAN) access point (AP) associated with the access device in accordance with the one or more communication parameters associated with the connection state of the cellular modem, wherein the number of spatial streams are selected in accordance with one or more bandwidth parts by selectively increasing or decreasing the number of spatial streams in accordance with a change in a number of the one or more bandwidth parts configured for the cellular modem; and
means for communicating with one or more stations (STAs) served by the access device using the WLAN AP in accordance with the connection state of the cellular modem and the number of spatial streams for the WLAN AP.

20. The apparatus of claim 19, wherein:
obtaining the one or more communication parameters comprises obtaining an indication of one or more bandwidth parts configured for the cellular modem.

21. The apparatus of claim 19, further comprising:
means for detecting an increase in bandwidth associated with the change in the number of the one or more bandwidth parts configured for the cellular modem; and
means for selectively increasing the number of spatial streams based at least in part on the detected increase.

22. The apparatus of claim 19, further comprising:
means for detecting a decrease in bandwidth associated with the change in the number of the one or more bandwidth parts configured for the cellular modem; and
means for selectively decreasing the number of spatial streams based at least in part on the detected decrease.

23. The apparatus of claim 19, wherein:
obtaining the one or more communication parameters comprises obtaining an indication of a data start marker and a data end marker associated with data transmission to the cellular modem; and
selecting the number of spatial streams is based at least in part on the data start marker and the data end marker.

24. The apparatus of claim 23, further comprising:
means for determining, based at least in part on the data start marker and the data end marker, an amount of downlink data received by the cellular modem, wherein the selected number of spatial streams is in proportion to the amount of downlink data received by the cellular modem.

25. The apparatus of claim 23, further comprising:
means for increasing the number of spatial streams based at least in part on obtaining the data start marker.

26. A non-transitory computer-readable medium storing code, the code comprising instructions executable by a processor to:
obtain one or more communication parameters associated with a connection state of a cellular modem associated with an access device;
select a number of spatial streams for a wireless local area network (WLAN) access point (AP) associated with the access device in accordance with the one or more communication parameters associated with the connection state of the cellular modem, wherein the number of spatial streams are selected in accordance with one or more bandwidth parts by selectively increasing or decreasing the number of spatial streams in accordance with a change in a number of the one or more bandwidth parts configured for the cellular modem; and
communicate with one or more stations (STAs) served by the access device using the WLAN AP in accordance with the connection state of the cellular modem and the number of spatial streams for the WLAN AP.

27. The non-transitory computer-readable medium of claim 26, wherein:
obtaining the one or more communication parameters comprises obtaining an indication of one or more bandwidth parts configured for the cellular modem.

\* \* \* \* \*